United States Patent
Ke et al.

(10) Patent No.: US 7,162,650 B2
(45) Date of Patent: Jan. 9, 2007

(54) NETWORK SWITCHING APPARATUS FOR SUPPLYING POWER TO NETWORK COMMUNICATION EQUIPMENT THROUGH TWISTED PAIR LINE

(75) Inventors: Chien-Jen Ke, Hsinchu (TW); Chien-Liang Chen, Hsinchu (TW); Wei-Hong Tsai, Hsinchu (TW)

(73) Assignee: D-Link Corporation, Hsinchu (TW)

( * ) Notice: Subject to any disclaimer, the term of this patent is extended or adjusted under 35 U.S.C. 154(b) by 687 days.

(21) Appl. No.: 09/962,322

(22) Filed: Sep. 26, 2001

(65) Prior Publication Data
US 2003/0061522 A1    Mar. 27, 2003

(51) Int. Cl.
G06F 1/26 (2006.01)
H04M 19/00 (2006.01)

(52) U.S. Cl. ........................... 713/300; 379/900
(58) Field of Classification Search ................ 713/300; 379/900
See application file for complete search history.

(56) References Cited

U.S. PATENT DOCUMENTS

| | | | | |
|---|---|---|---|---|
| 5,991,885 | A * | 11/1999 | Chang et al. ............... | 713/300 |
| 6,115,468 | A * | 9/2000 | De Nicolo .................. | 379/413 |
| 6,295,356 | B1 * | 9/2001 | De Nicolo .................. | 379/413 |
| 6,496,103 | B1 * | 12/2002 | Weiss et al. ........... | 340/310.01 |
| 6,535,983 | B1 * | 3/2003 | McCormack et al. ....... | 713/310 |
| 6,571,181 | B1 * | 5/2003 | Rakshani et al. ............. | 702/60 |

* cited by examiner

*Primary Examiner*—Thomas Lee
*Assistant Examiner*—Ji H. Bae
(74) *Attorney, Agent, or Firm*—Bacon & Thomas, PLLC

(57) ABSTRACT

A network switching apparatus for supplying power to network communication equipment through a twisted pair line comprising a power control circuit having a plurality of sockets, each socket connected with a RJ-45 connector so as to electrically connect the switching apparatus to a corresponding socket of the communication equipment through the twisted pair line of RJ-45 connector, and having the ability to identify, in accordance with specifications stipulated in IEEE 802.3af, whether the communication equipment has the capability of receiving power from each socket through the twisted pair line prior to supplying power to the communication equipment.

11 Claims, 4 Drawing Sheets

NETWORK SWITCHING APPARATUS FOR SUPPLYING POWER TO NETWORK COMMUNICATION EQUIPMENT THROUGH TWISTED PAIR LINE

FIELD OF THE INVENTION

The present invention relates to networks and more particularly to a network switching apparatus for supplying power to network communication equipment through twisted pair line.

BACKGROUND OF THE INVENTION

Technologies have known a rapid and a spectacular development in recent decades. Also, more and more people get involved in bustling life in this competitive world. Convenient transportation further contributes much to the booming business. In one aspect, for many people telecommunication equipment such as telephones are essential to their daily life. People think that good telecommunication equipment is capable of increasing working efficiency. In an emergency, such telecommunication equipment may save people' life. In this regard, a user may always want his/her telecommunication equipment to maintain operable all the time. Hence, all telecommunication equipment providers endeavor to satisfy such demand of users.

Recently, newly available network communication equipment such as Voice Over IP Device (VoIP) or modem is capable of providing inexpensive long distance (or international) calls. Hence, users may find that they can save a significant amount of telecommunication charge by using such network communication equipment instead of conventional Public Switching Telephone Network (PSTN) in communication. In a survey conducted by telecommunication equipment manufacturer, more than 70% of PSTN users would like to switch to use network communication equipment in communication after considering the saving of fee.

A typical network communication equipment (e.g., VoIP or modem) 11 is shown in FIG. 1. As shown, an adapter 12 interconnects network communication equipment 11 and a plug 13 capable of inserting into an outlet of external power. It means that network communication equipment 11 is externally powered. At least one telephone 10 is coupled to network communication equipment 11 so that voice signals from telephone 10 may be converted into digital signals in network communication equipment 11. Digital signals are further processed to form IP packets prior to transmission. In detail, formed IP packets in network communication equipment 11 are sent to Internet server 15 through network switching apparatus 14. Further, user may communicate with other people having the same network communication equipment through server 15.

However, the previous configuration suffered from a disadvantage. As stated above, network communication equipment 11 is externally powered. Hence, network communication equipment 11 is inoperable when power is out. As an end, communication is interrupted. Such communication interruption may cause inconvenience or even serious consequences.

Thus, it is desirable to provide an improved network switching apparatus for supplying power to network communication equipment through twisted pair line. It utilizes power of network switching apparatus for maintaining an ongoing communication with remote telephone when power out occurs. Whereby, it is possible of overcoming the above drawback of prior art, i.e., communication interruption due to power out.

SUMMARY OF THE INVENTION

It is therefore an object of the present invention to provide a power control circuit into an existing network switching apparatus. The power control circuit has a plurality of sockets each for inserting a RJ-45 connector having twisted pair lines so as to electrically connect the network switching apparatus to a corresponding socket of the network communication equipment through the twisted pair line. The power control circuit, in accordance with specifications stipulated in IEEE 802.3af, identifies that whether the network communication equipment has the capability of receiving power from the socket of power control circuit through pins of the RJ-45 connector prior to supplying power of network switching apparatus to the coupled network communication equipment through the twisted pair line.

In one aspect of the present invention, the power control circuit comprises at least one microprocessor, an oscillation circuit interconnected the microprocessors, a bus driver circuit connected to the microprocessor, a plurality of RS-232 driver interfaces coupled to the microprocessor through the bus driver circuit, and an analog switching circuit interconnected each socket and each RS-232 driver interface and including a plurality of analog switches (e.g., relays) each interconnected the corresponding socket and RS-232 driver interface and protection circuits associated with the analog switches. The switching of each analog switch is under the control of microprocessor. Twisted pair line of each RJ-45 connector is utilized to connect corresponding socket of network communication equipment. A passive device in network communication equipment is provided for generating activation signals in response to the received special signals from power control circuit. The activation signals are then sent back to power control circuit through twisted pair line. Whereby, microprocessor can drive corresponding switch of analog switching circuit and turn on power in response to the received activation signals. As an end, power is supplied to network communication equipment. This can maintain a normal communication of network communication equipment even in a power out state.

The above and other objects, features and advantages of the present invention will become apparent from the following detailed description taken with the accompanying drawings.

DETAILED DESCRIPTION OF THE PREFERRED EMBODIMENTS

As known, a typical network communication equipment is coupled to at least one telephone for converting voice signals therefrom into digital signals. Digital signals are processed to form IP packets which are further sent through the Internet for effecting a communication between two users using the same network communication equipment. Such technique is advantageous over the prior art in making long distance (or international) calls due to low charge. Generally speaking, for providing a high quality communication from network switching apparatus to each coupled network communication equipment at user end, in addition to performing regular maintenance on network switching apparatus in panel room, network system supplier for providing network communication services has to install an independent backup generator in the panel room. Whereby, the backup generator may be activated to supply power to network switching apparatus for maintaining a normal operation of network switching apparatus (i.e., communication between network communication equipment and telephone is not adversely affected) when power is out.

Figure 1:
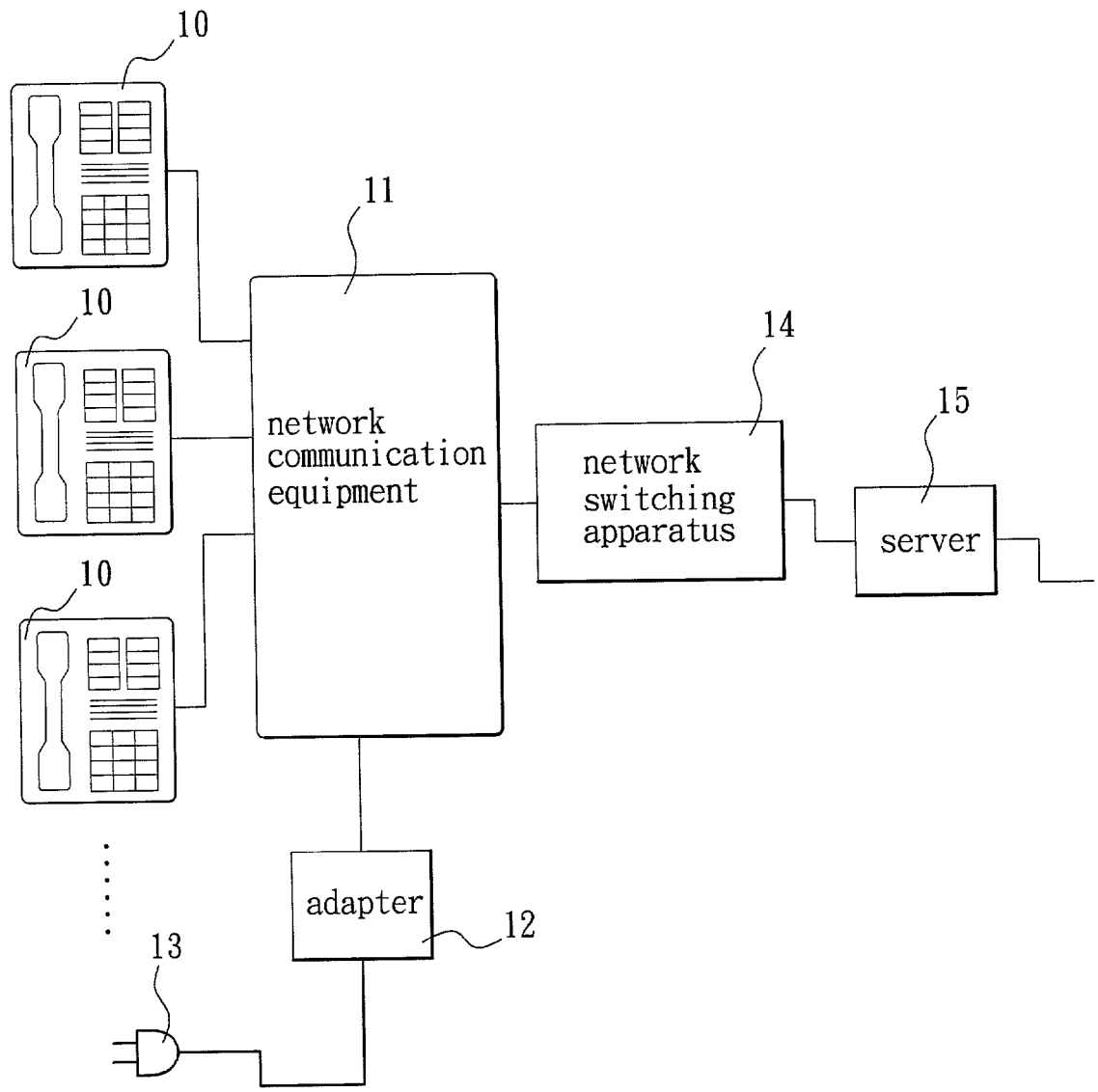
FIG. 1 presents schematically the connection of a conventional network communication equipment.
Figure 2:
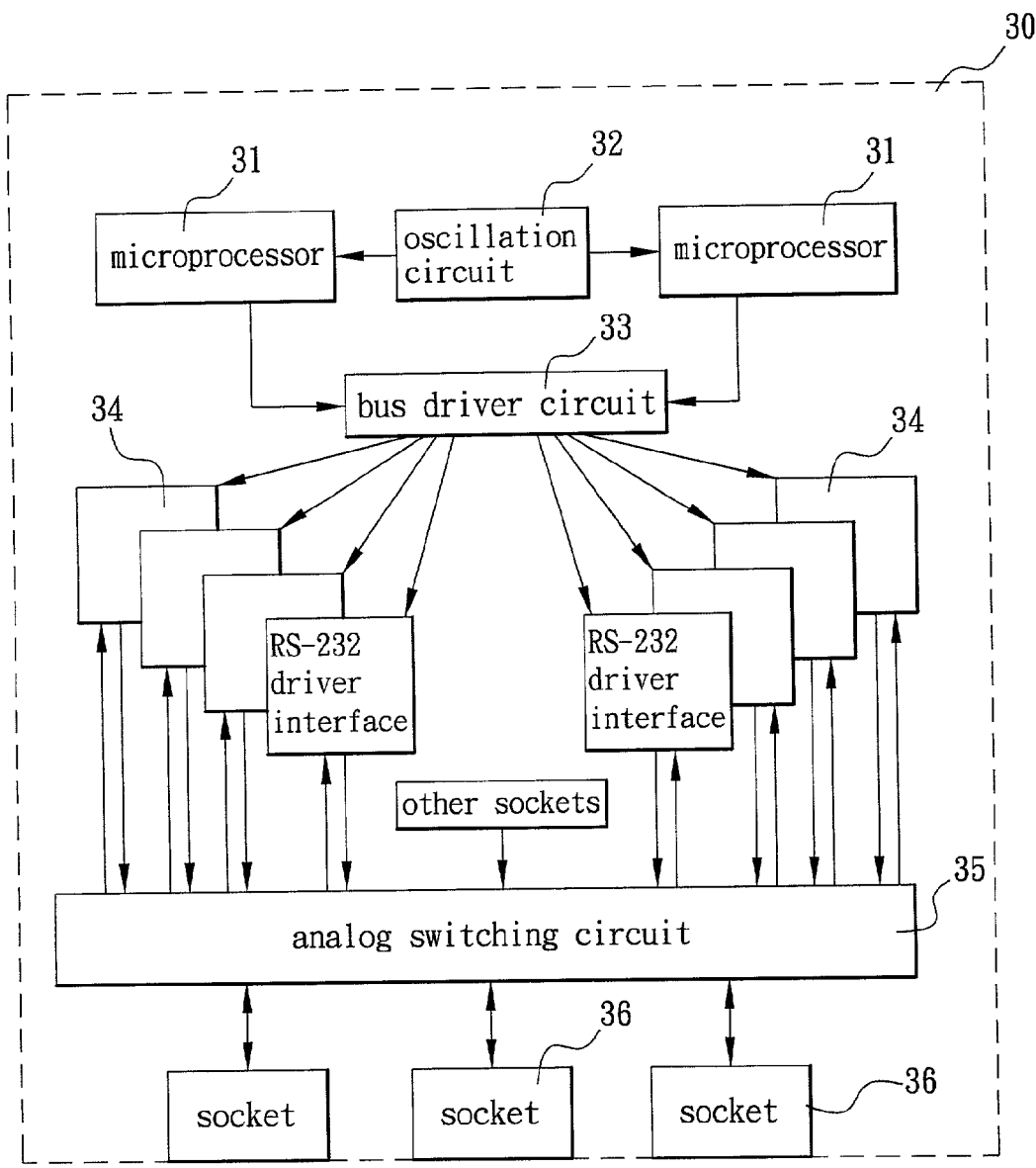
FIG. 2 presents schematically the connection of a power control circuit incorporated into an existing network switching apparatus according to a second preferred embodiment of the invention.

The invention thus utilizes the uninterruptable power supply provided to the machines, such as network switching apparatus, in panel room enabling network switching apparatus to supply power to each coupled network communication equipment through twisted pair line so as to maintain a normal operation of network communication equipment even there is a power out in any one of user ends. Referring to FIG. 2, there is shown a schematic diagram of the connection of a power control circuit 30 incorporated into an existing network switching apparatus according to a first embodiment of the invention. Power control circuit 30 comprises at least one microprocessor (two are shown) 31, an oscillation circuit 32 interconnected microprocessors 31, a bus driver circuit 33 interconnected microprocessors 31, a plurality of RS-232 driver interfaces 34 each coupled to the corresponding microprocessor 31 through a bus driver circuit 33, a plurality of sockets 36, and an analog switching circuit 35 including a plurality of analog switches (e.g., relays) each interconnected the corresponding socket 36 and RS-232 driver interface 34 and protection circuits associated with the analog switches. The switching of connection of each analog switch is under the control of microprocessor 31. Socket 36 is implemented as 2×20 pins so as to couple to RJ-45 connector 37 configured as 2×4 pins. Twisted pair line 38 of RJ-45 connector 37 is utilized to connect corresponding socket of each network communication equipment. Thus it is possible of supplying power of network switching apparatus to each coupled network communication equipment through twisted pair line 38.

In the invention, a specially designed passive device is provided in socket of each network communication equipment for generating activation signals in response to the received special signals from power control circuit 30. The activation signals are then sent back to power control circuit 30 through twisted pair line 38 and RJ-45 connector 37. Microprocessor 31 can drive corresponding switch of analog switching circuit 35 and turn on power in response to the received activation signals. As an end, power is supplied to network communication equipment.

The invention employs pins of numbers 4, 5, 7, and 8 of RJ-45 connector 37 to detect on/off of power and to supply power in accordance with the specifications stipulated in IEEE 802.3af. Also, pins of numbers 1, 2, 3, and 6 of RJ-45 connector 37 are used for transmitting data signals. As shown in the first embodiment of the invention (FIG. 2), as each socket 36 of network switching apparatus is coupled to each network communication equipment through RJ-45 connector 37 and twisted pair line 38, oscillation circuit 32 will generate signals having a predetermined frequency (e.g., pulse signals of 10 Hz). Such signals are then sent to network communication equipment coupled to each socket 36 through microprocessor 31, bus driver circuit 33, each RS-232 driver interface 34, analog switching circuit 35, and pin of number 4 of socket 36 corresponding to RJ-45 connector 37 sequentially. As stated above, a specially designed passive device (e.g., rectifier circuit in the embodiment) 40 is provided in socket of each network communication equipment. Further, A loop of the passive device 40 is used to send the received predetermined frequency signals back to network switching apparatus through pin of number 5 of socket 36 corresponding to RJ-45 connector 37.

After network switching apparatus has received signals sent back from network communication equipment, microprocessor 31 identifies that network communication equipment has the capability of receiving power from socket based on the signals. At this time, microprocessor 31 drives analog switching circuit 35 to switch corresponding switch of analog switching circuit 35 for turning on power. Finally, power of network switching apparatus is supplied to each coupled network communication equipment through pins of numbers 4 and 5 or 7 and 8 of socket 36 corresponding to RJ-45 connector 37. Thus it is possible of maintaining a normal communication of network communication equipment in a power out condition.

Figure 3:
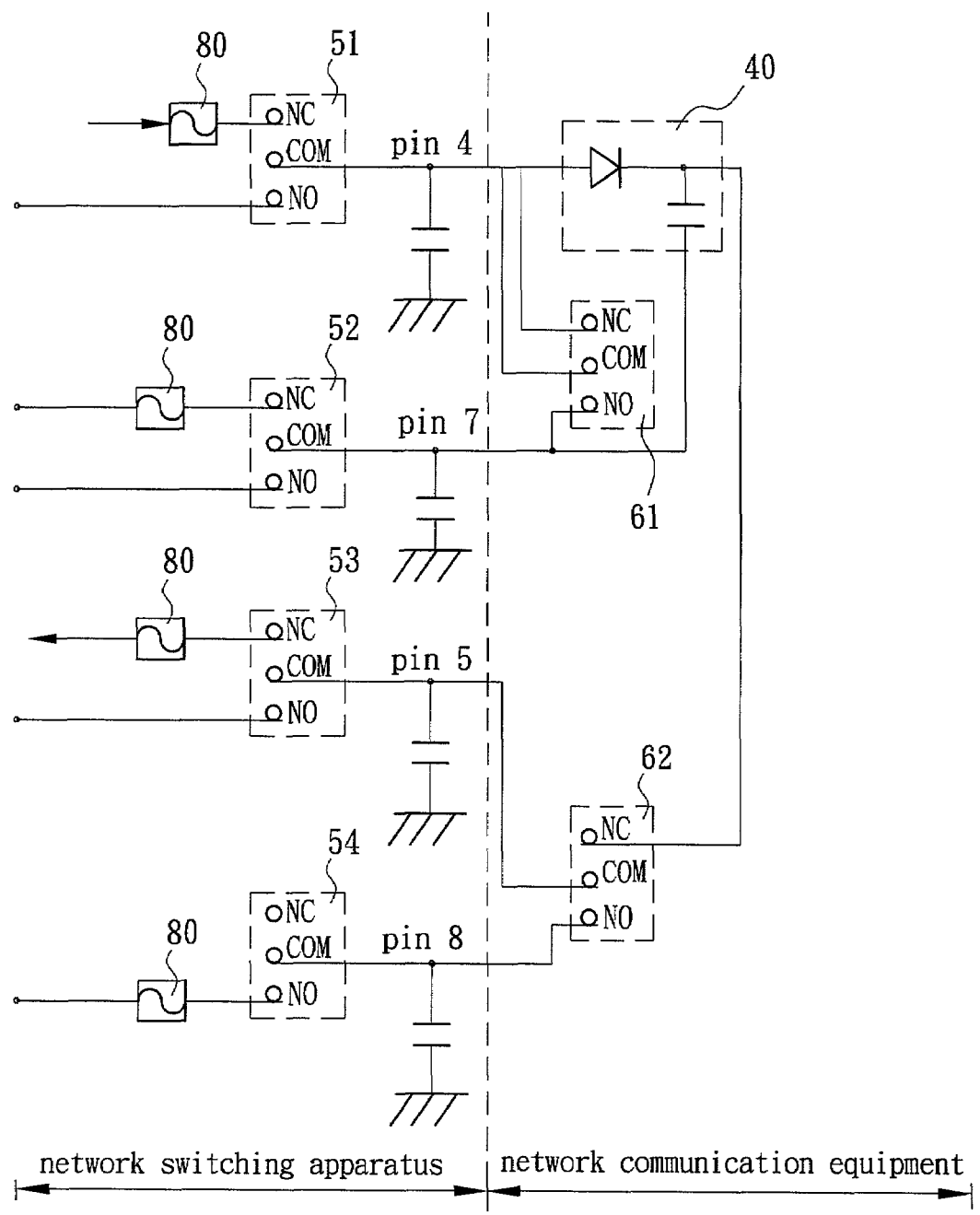
FIG. 3 presents schematically the connection of the network switching apparatus and pins of network communication equipment according to a second preferred embodiment of the invention.

FIG. 3 presents schematically the connection of the network switching apparatus and network communication equipment according to a second preferred embodiment of the invention. Analog switching circuit 35 comprises a plurality of switches such as relays 51, 52, 53, and 54. Common contact COM of each of relays 51, 52, 53, and 54 is coupled to pins of numbers 4, 7, 5, and 8 of each coupled socket 36 respectively. At least two of relays 51, 52, 53, and 54 are normal closed (NC) contacts. Each NC contact is in turn coupled to microprocessor 31 through RS-232 driver interface 34 and bus driver circuit 33 for receiving generated signals from oscillation circuit 32. The received signals are further sent to network communication equipment coupled to each socket 36. Alternatively, each NC contact receives signals sent back from passive device 40 of each network communication equipment. Normal open (NO) contacts of relays 51, 52, 53, and 54 are coupled to power terminal of network switching apparatus. Hence, while the network switching apparatus receiving the signals from network communication equipment and identifying that network communication equipment has the capability of receiving power from socket, microprocessor 31 drives relays 51, 52, 53, and 54 for connecting NO contacts to common contact COM. Finally, power of network switching apparatus is supplied to each coupled network communication equipment through pins of numbers 4 and 5 or 7 and 8 of socket 36 corresponding to RJ-45 connector 37.

Referring to FIG. 3 again, relays 61 and 62 are provided on socket of network communication equipment corresponding to pins of numbers 4 and 5 or 7 and 8 of RJ-45 connector 37. Common contacts COMs of relays 61 and 62 are coupled to pins of numbers 4 and 5 of each socket 36 respectively. NC contact of each of relays 61 and 62 is coupled to two ends of passive device 40 for receiving the predetermined frequency signals generated by the network switching apparatus and transmitting signals generated by passive device 40 back to the network switching apparatus.

NO contact of each of relays 61 and 62 is coupled to pins of numbers 7 and 8 of each socket 36 for receiving power therefrom.

Figure 4:
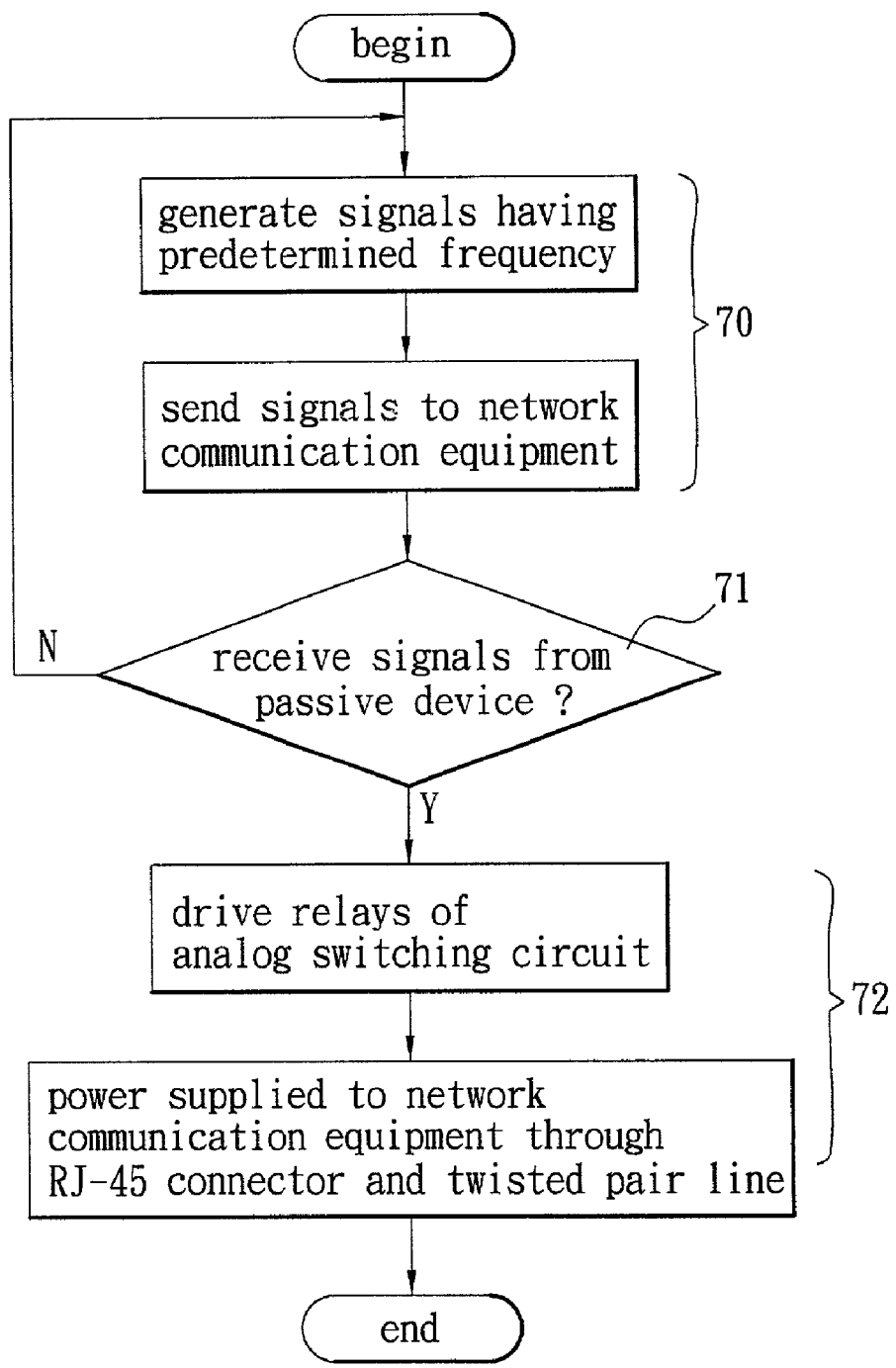
FIG. 4 is a flow chart illustrating states of the connection of the network switching apparatus and pins of network communication equipment according to the invention.

As sockets 36 of network switching apparatus coupled to corresponding sockets of each network communication equipment through twisted pair lines 38 of RJ-45 connector 37*s*, microprocessor 31 of network switching apparatus may perform a series of steps as best illustrated in the flow chart of FIG. 4 so as to drive relays 51, 52, 53, and 54 of analog switching circuit. As a result, power of network switching apparatus is switched to network communication equipment. These steps comprises:

Step 70, generate signals having a predetermined frequency (e.g., pulse signals of 10 Hz). Switch relays 51, 52, 53, and 54 to closed states (i.e., NC contacts coupled to common contacts COMs). Hence, signals may be sent to network communication equipment coupled to each socket 36 through pin of number 4 corresponding to RJ-45 connector 37.

Step 71, determine whether corresponding signals sent back from passive device 40 has been received. If not, process loops back to step 70. If yes, process continues.

Step 72, after receiving signals sent back from passive device 40, it is possible of identifying that network communication equipment has the capability of receiving power from socket based on the signals. At this time, drive analog switching circuit 35 to switch relays 51, 52, 53, and 54 of analog switching circuit 35 for causing them to be in open states (i.e., NO contacts coupled to common contacts COMs). Hence, power is on. Finally, power of network switching apparatus is supplied to network communication equipment through corresponding RJ-45 connector 37 and twisted pair line 38.

In the second embodiment, relays 61 and 62 of network communication equipment are powered by network switching apparatus. It means that as power of network switching apparatus is supplied to network communication equipment, relays 61 and 62 will be driven to switch from normal closed states to normal open states. Further, for preventing power control circuit 30 of network switching apparatus from being damaged by abnormal spike pulses generated by network communication equipment, a plurality of protection circuits 80 are provided on the connection between relays 51, 52, 53, and 54 of analog switching circuit 35 and power control circuit 30 for maintaining a normal operation of power control circuit 30.

While the invention has been described by means of specific embodiments, numerous modifications and variations could be made thereto by those skilled in the art without departing from the scope and spirit of the invention set forth in the claims.

What is claimed is:

1. A network switching apparatus for supplying power to network communication equipment, the network switching apparatus comprising:
    a network switching circuit for exchanging packets;
    at least one socket, each connected to an RJ-45 connector having a twisted pair line so as to electrically connect the network switching apparatus to a corresponding socket of the network communication equipment through the twisted pair line; and
    a power control circuit electrically connected to the at least one socket of the network switching apparatus, the power control circuit being operable to generate signals having a predetermined frequency and in accordance with specifications stipulated in IEEE 802.3af, transmit the signals having the predetermined frequency to the network communication equipment through pins of the at least one socket, and supply power of the network switching apparatus to the network communication equipment through the RJ-45 connector and the twisted pair line thereof in response to signals received from the network communication equipment, wherein the power control circuit comprises:
    at least one microprocessor;
    an oscillation circuit connected to the microprocessor, the oscillation circuit being operable to generate signals having a predetermined frequency and transmit the signals having the predetermined frequency to the network communication equipment coupled to the at least one socket through the microprocessor and the pins of the at least one socket corresponding to the RJ-45 connector;
    a bus driver circuit connected to the microprocessor;
    a plurality of RS-232 driver interfaces coupled to the microprocessor through the bus driver circuit; and
    an analog switching circuit interconnected to each at least one socket and each RS-232 driver interface and including a plurality of analog switches each interconnected to the corresponding at least one socket and each RS-232 driver interface, a switching of each analog switch being under a control of the microprocessor for supplying power from the network switching apparatus to each of the coupled network communication equipment, and
    wherein the oscillation circuit is operable, under control of the microprocessor, to generate the signals having the predetermined frequency and transmit the signals having the predetermined frequency to the network communication equipment coupled to the at least one socket through the microprocessor, the bus driver circuit, the RS-232 driver interfaces, the analog switching circuit, and the pins of the at least one socket corresponding to the RJ-45 connector, and to switch the analog switching circuit for supplying power of the network switching apparatus to the network communication equipment through the RJ-45 connector and the twisted pair line thereof in response to signals received from the network communication equipment.

2. The apparatus of claim 1, further comprising a passive device in the socket of the network communication equipment for generating activation signals in response to the received signals from the power control circuit, wherein the activation signals having the predetermined frequency are transmitted back to the power control circuit through the twisted pair line and the RJ-45 connector so that the microprocessor is capable of driving the analog switching circuit and turning on power in response to the received activation signals, and supplying power to the network communication equipment.

3. The apparatus of claim 1, wherein the socket of the network switching apparatus corresponding to the RJ-45 connector comprises a fourth, a fifth, a seventh, and an eighth pins for detecting an on/off of power and supplying power, and a first, as second, a third, and a sixth pins for transmitting data signals.

4. The apparatus of claim 3, wherein the signals having the predetermined frequency are transmitted to the network communication equipment coupled to the at least one socket through the fourth pin of the at least one socket corresponding to the RJ-45 connector.

5. The apparatus of claim 3, wherein the passive device comprises a loop for transmitting the received signals having the predetermined frequency back to the network switching apparatus through the fifth pin of the at least one socket corresponding to the RJ-45 connector in response to the received signals having the predetermined frequency.

6. The apparatus of claim 3, wherein each analog switch is a relay having a common contact coupled to one of the fourth, the fifth, the seventh, and the eighth pins of the at least one socket.

7. The apparatus of claim 6, wherein at least two of the relays include normally closed (NC) contacts each coupled to the microprocessor through each RS-232 driver interface and the bus driver circuit for receiving the generated signals having the predetermined frequency from the oscillation circuit and transmitting the received signals having the predetermined frequency to the network communication equipment coupled to the socket or receiving the signals having the predetermined frequency transmitted back from the passive device of the network communication equipment.

8. The apparatus of claim 6, wherein at least one of the relays includes a normally open (NO) contact coupled to a power terminal of the network switching apparatus, and is driven by the microprocessor for connecting the NO contacts to the common contact and supplying power of the network switching apparatus to the coupled network communication equipment while the network switching apparatus receives the signals having the predetermined frequency from the network communication equipment.

9. The apparatus of claim 3, further comprising a relay on each of either the fourth and the seventh pins or the fifth and the eighth pins of the socket of the network communication equipment corresponding to the RJ-45 connector, each relay having a common contact coupled to each of the fourth and the fifth pins of the socket.

10. The apparatus of claim 9, wherein each relay comprises an NC contact coupled to two ends of the passive device for receiving the signals having the predetermined frequency generated by the network switching apparatus and transmitting activation signals generated by the passive device back to the network switching apparatus.

11. The apparatus of claim 9, wherein each relay comprises an NO contact coupled to the seventh and the eighth pins of each socket of the network communication equipment for receiving power therefrom.

* * * * *